United States Patent
Ip et al.

(10) Patent No.: US 11,897,453 B2
(45) Date of Patent: Feb. 13, 2024

(54) PARKING SPOT DETECTION REINFORCED BY SCENE CLASSIFICATION

(71) Applicant: Continental Automotive Systems, Inc., Auburn Hills, MI (US)

(72) Inventors: Julien Ip, Royal Oak, MI (US); Eduardo Jose Ramirez Llanos, Auburn Hills, MI (US); Xin Yu, Rochester Hills, MI (US); Kyle Carpenter, Clarkston, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 208 days.

(21) Appl. No.: 17/134,750

(22) Filed: Dec. 28, 2020

(65) Prior Publication Data

US 2022/0203964 A1 Jun. 30, 2022

(51) Int. Cl.
| | |
|---|---|
| *B60W 30/06* | (2006.01) |
| *G06T 7/70* | (2017.01) |
| *G06N 3/02* | (2006.01) |
| *G08G 1/14* | (2006.01) |
| *G06V 20/58* | (2022.01) |

(52) U.S. Cl.
CPC .............. *B60W 30/06* (2013.01); *G06N 3/02* (2013.01); *G06T 7/70* (2017.01); *G06V 20/582* (2022.01); *G06V 20/586* (2022.01); *G08G 1/145* (2013.01); *G06T 2207/20084* (2013.01); *G06T 2207/30264* (2013.01)

(58) Field of Classification Search
CPC .... B60W 30/06; B60W 2420/42; G06N 3/02; G06T 7/70; G06T 2207/20084; G06T 2207/30264; G06V 20/582; G06V 20/586; G08G 1/145
See application file for complete search history.

(56) References Cited

U.S. PATENT DOCUMENTS

| | | | |
|---|---|---|---|
| 10,311,731 B1* | 6/2019 | Li | G08G 1/012 |
| 10,406,979 B2* | 9/2019 | Kim | G06T 13/80 |
| 10,546,202 B2* | 1/2020 | Hummelshøj | G06T 17/05 |
| 10,580,300 B1* | 3/2020 | Rosenblatt | G08G 1/147 |
| 11,062,156 B1* | 7/2021 | Vallance | G06V 20/588 |
| 11,062,602 B1* | 7/2021 | Beaurepaire | G08G 1/146 |
| 11,164,415 B1* | 11/2021 | Reynolds, III | G06T 7/73 |
| 11,170,235 B2* | 11/2021 | Okada | G06V 20/586 |
| 2016/0307069 A1* | 10/2016 | Wu | G06V 10/772 |
| 2017/0092130 A1* | 3/2017 | Bostick | G08G 1/015 |
| 2017/0315231 A1* | 11/2017 | Wodrich | G01S 13/931 |
| 2018/0065623 A1* | 3/2018 | Wodrich | B60W 40/114 |
| 2018/0150764 A1* | 5/2018 | Stenneth | G01C 21/3685 |
| 2018/0339654 A1* | 11/2018 | Kim | G09G 5/37 |
| 2020/0035101 A1* | 1/2020 | Brooks | G08G 1/143 |
| 2020/0066155 A1* | 2/2020 | Rosenblatt | G08G 1/142 |
| 2020/0210788 A1* | 7/2020 | Chinni | G06N 20/00 |
| 2020/0250440 A1* | 8/2020 | Campos | G06N 3/04 |
| 2020/0311848 A1* | 10/2020 | Weldemariam | G06Q 20/4015 |

(Continued)

Primary Examiner — Santiago Garcia

(57) ABSTRACT

An automated parking system for a vehicle includes a camera configured to obtain images of objects proximate the vehicle, and a controller configured to review the obtained images of objects proximate the vehicle to classify an environment proximate the vehicle, determine a type of parking lot associated with the classified location and initiate an automated parking function of the vehicle corresponding to the determined type of parking lot.

17 Claims, 4 Drawing Sheets

(56) References Cited

U.S. PATENT DOCUMENTS

2021/0295066 A1\* 9/2021 Vallance .................... G06T 7/74
2022/0044198 A1\* 2/2022 Meister .............. G06Q 10/0838
2022/0157068 A1\* 5/2022 Campos ................... G06N 3/04

\* cited by examiner

PARKING SPOT DETECTION REINFORCED BY SCENE CLASSIFICATION

TECHNICAL FIELD

The present disclosure relates to driver assist and autonomous vehicle systems, and more specifically to a system and method of identifying an environment of operation based on images of infrastructure surrounding the vehicle.

BACKGROUND

Vehicles may be equipped with a driver assist and/or autonomous vehicle operation system to operate a vehicle partially and/or fully independent of a vehicle operator. Information about the environment in which the vehicle is operating is needed to enable such systems to operate the vehicle. GPS and other positioning systems provide some information but may not always be available. Operation of the vehicle may vary depending on the environment and location. For example, vehicle operation in a mall parking lot will be different than operation of the vehicle in a rest stop or camp ground parking lot. Gathering additional information about the environment surrounding a vehicle may be desirable.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An automated parking system for a vehicle according to an exemplary embodiment of this disclosure includes, among other possible things, a camera configured to obtain images of objects proximate the vehicle, and a controller configured to review the obtained images of objects proximate the vehicle to classify an environment proximate the vehicle, determine a type of parking lot associated with the classified location and initiate an automated parking function of the vehicle corresponding to the determined type of parking lot.

In another example embodiment of the foregoing automated parking system, the controller includes a neural network to classify the environment proximate the vehicle based on a comparison of stored images corresponding to a known parking lot and the obtained images.

In another example embodiment of any of the foregoing automated parking systems, the camera obtains images of structures and controller classifies the type of parking lot based on the type of structure proximate to the parking lot.

In another example embodiment of any of the foregoing automated parking systems, the controller initiates the automated parking function based on a configuration of the vehicle.

In another example embodiment of any of the foregoing automated parking systems, the controller initiates a scanning process for a desired parking spot based on the determined type of parking lot.

In another example embodiment of any of the foregoing automated parking systems, the configuration of the vehicle includes a trailer.

In another example embodiment of any of the foregoing automated parking systems, the automated parking function includes defining a vacant spot for the vehicle is defined as two adjacent and vertically aligned vacant parking spots.

In another example embodiment of any of the foregoing automated parking systems, the image of structures utilized for classifying the environment of the vehicle comprises a building.

In another example embodiment of any of the foregoing automated parking systems, the image of structures utilized for classifying the environment of the vehicle comprises a shape of a sign adjacent a structure.

A controller for an automated parking system according to an exemplary embodiment of this disclosure includes, among other possible things, a processor configured to receive images from a camera mounted within a vehicle, review the obtained images of objects proximate the vehicle to classify an environment proximate the vehicle, determine a type of parking lot associated with the classified environment and initiate an automated parking function of the vehicle corresponding to the determined type of parking lot.

In another example embodiment of the foregoing controller, the controller includes a neural network to classify the environment of the vehicle based on a comparison of stored images corresponding to a known parking lot and the obtained images.

In another example embodiment of any of the foregoing controllers, the neural network is configured to classify the type of parking lot based on the type of structure proximate to the parking lot.

In another example embodiment of any of the foregoing controllers, the processor initiates the automated parking function based on a configuration of the vehicle.

In another example embodiment of any of the foregoing controllers, the automated parking function includes defining a vacant spot for the vehicle is defined as two adjacent and vertically aligned vacant parking spots.

A method of automated parking spot detection according to an exemplary embodiment of this disclosure includes, among other possible things, obtaining images of infrastructure proximate a vehicle with a camera mounted on the vehicle, classifying an environment of the vehicle based on the infrastructure with a neural network, and operating systems of the vehicle according to a predefined set of vehicle operating parameters corresponding to the classified environment.

In another example embodiment of the foregoing method, the neural network classifies the environment of the vehicle based on comparisons of stored images corresponding to known infrastructure and a parking lot configuration corresponding with the known infrastructure.

In another example embodiment of any of the foregoing methods, the method includes determining a configuration of the vehicle and operating systems of the vehicle based on the determined configuration of the vehicle.

In another example embodiment of any of the foregoing methods, the method includes defining a vacant spot for the vehicle as two adjacent and vertically aligned vacant spots in response to the vehicle configuration including a trailer.

In another example embodiment of any of the foregoing methods, the method includes defining a vacant spot for the vehicle as an unoccupied spot between white lines in response location being identified as a paved parking lot adjacent to a building.

In another example embodiment of any of the foregoing methods, the method includes defining a vacant spot for the vehicle as an unoccupied spot based on placement of other vehicles within the classified environment, wherein the classified environment is identified as being an open space without buildings.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
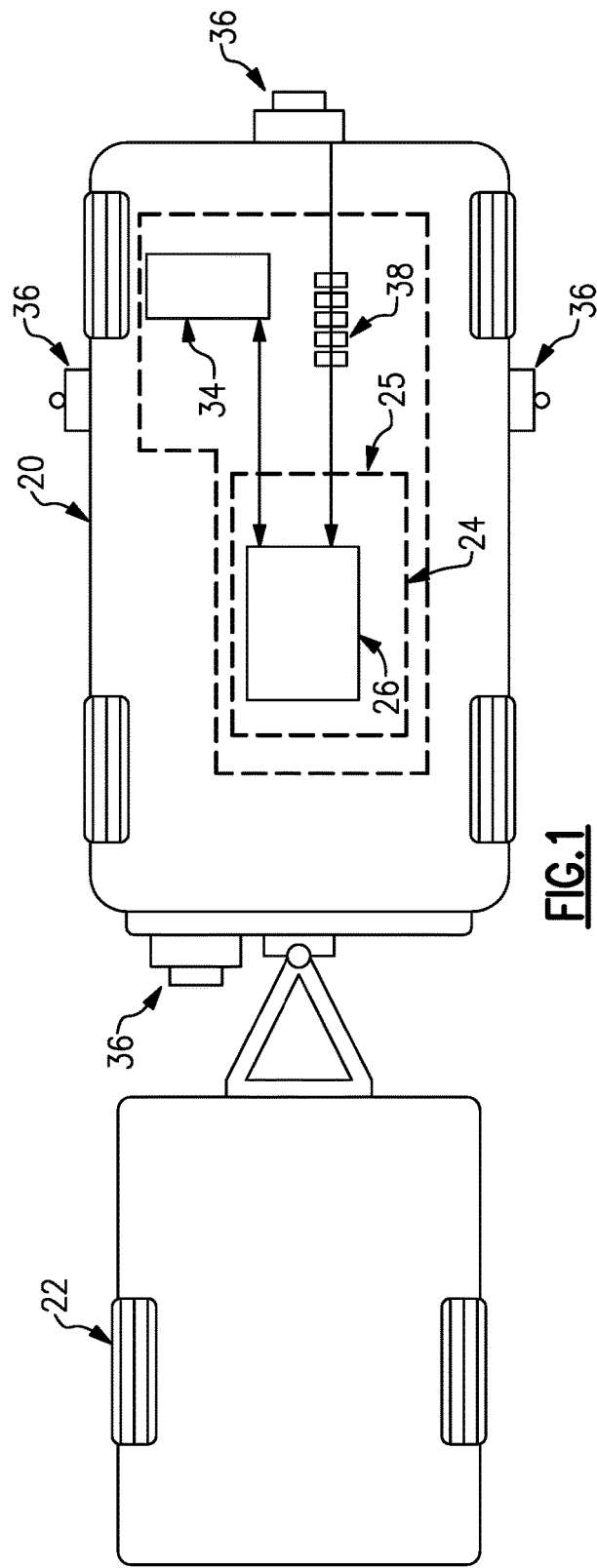
FIG. 1 is a schematic view of a vehicle including an example an automated parking system embodiment.

Referring to FIG. 1, a vehicle 20 is shown schematically and includes an automated parking assist system 24. The automated parking assist system 24 may be part of an overall driver assist or autonomous vehicle operating system indicated at 25. The automated parking assist system 24 includes a controller 26 that receives information in form of images 38 from at least one of several vehicle cameras 36 located around the vehicle 20. The controller 26 uses the images 38 from the cameras 36 to identify infrastructure around the vehicle 20. The controller 26 either autonomously operates a vehicle system schematically shown at 34 and/or prompts a driver to take certain actions based on the identified infrastructure. In an example disclosed embodiment, the vehicle 20 uses the identified structure to determine and/or confirm a parking lot configuration and thereby operate the vehicle in conformance to the parking lot configuration.

The disclosed vehicle 20 and operating system 25 are shown schematically and may be part of an operator assist system or a fully autonomous vehicle operating system. The vehicle may be of any configuration and may be operating with a trailer 22. The example operating system 25 accounts for operation with the trailer 22 both on the road and in the selection and maneuvering operation within a parking lot.

Figure 2:
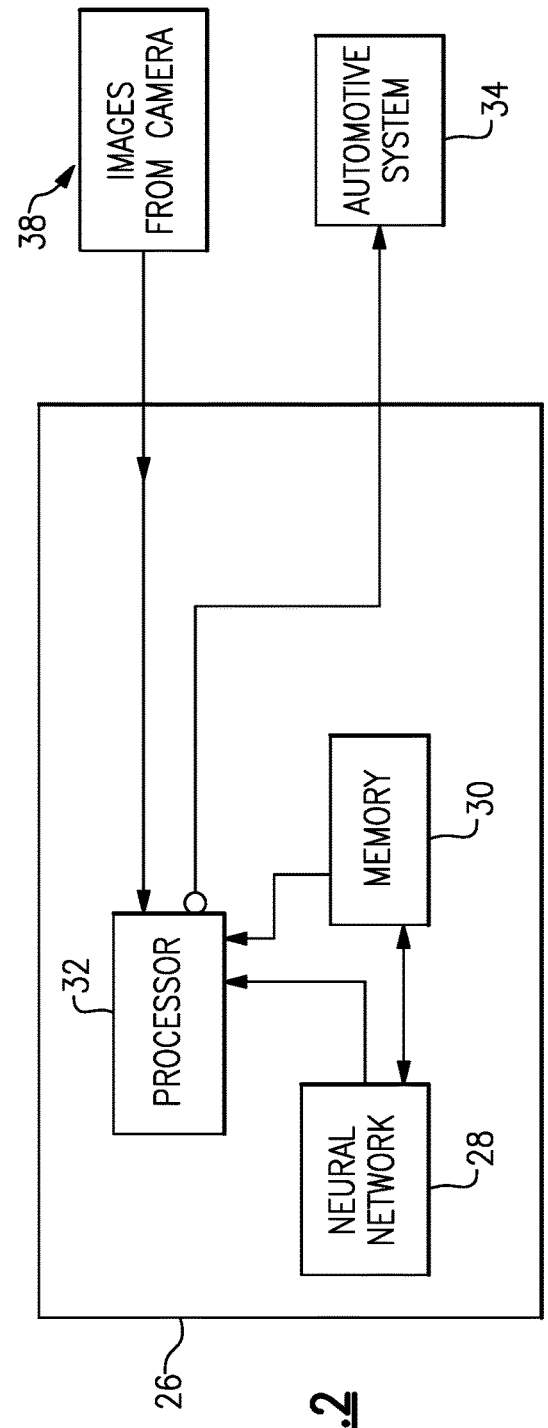
FIG. 2 is a schematic view of an example controller for an automated parking system embodiment.

Referring to FIG. 2, with continued reference to FIG. 1, the controller 26 is schematically shown and includes a processor 32, a memory device 30 and an artificial intelligence algorithm such as the disclosed example neural network schematically indicated at 28. Although the neural network 28 is shown schematically as an independent feature, it may be formed as portions of the processor 32 and memory 30 and its functions executed by another artificial intelligence algorithm.

The controller 26 and the processor 32 may be a hardware device for executing software, particularly software stored in the memory 30. The processor 32 can be a custom made or commercially available processor, a central processing unit (CPU), an auxiliary processor among several processors associated with the computing device, a semiconductor based microprocessor (in the form of a microchip or chip set) or generally any device for executing software instructions.

The memory 30 can include any one or combination of volatile memory elements (e.g., random access memory (RAM, such as DRAM, SRAM, SDRAM, VRAM, etc.)) and/or nonvolatile memory elements. Moreover, the memory 30 may incorporate electronic, magnetic, optical, and/or other types of storage media. Note that the memory can also have a distributed architecture, where various components are situated remotely from one another, but can be accessed by the processor.

The software in the memory 30 may include one or more separate programs, each of which includes an ordered listing of executable instructions for implementing disclosed logical functions and operation. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

Input/Output devices (not shown) that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the system 24 is in operation, the processor 32 can be configured to execute software stored within the memory 30, to communicate data to and from the memory 30, and to generally control operations of the system 24 pursuant to the software. Software in memory, in whole or in part, is read by the processor, perhaps buffered within the processor, and then executed.

The disclosed example neural network 28 operates as part of the controller 26 and processor 32 to identify images received by the cameras 36. The neural network 28 may be any combination of hardware and software that identifies an infrastructure feature such that the controller 26 may operate the vehicle 20 in a predetermined manner corresponding with the identified infrastructure.

The example neural network 28 is taught to identify infrastructure by analyzing example images of know infrastructure. For example, the neural network 28 might be provided images of a mall, common store front, hospital, chain restaurant or other structure that are so labeled. The neural network 28 analyzes the labeled images and using the results can identify with an acceptable level of certainty other similar images. The neural network 28 continues to generate identifying characteristics corresponding with each infrastructure to further improve certainty levels and expand the number of different infrastructure identifiable by the system. The example neural network 28 disclosed in one example embodiment provides for the identification of structures such as buildings, signs, spacial relationships between structures and other common features and criteria to determine and/or confirm a location of the vehicle 20 and to further determine and/or confirm a configuration of an associated parking lot or area.

The example system parking assist system 24 classifies a scene from the images 38 and recognizes a parking area associated with the scene while the vehicle 20 is driving. The neural network 28 provides for the system 24 to recognize differences between a supermarket parking lot, a shopping mall parking lot or a campground area. Although several examples are provided by way of example system 24 other infrastructures that may be associated with a parking area may also be implemented to determined parking requirements as they related to parking areas near hospitals, airports, police stations, fast food restaurant chains, and any other building area and infrastructure.

The disclosed example system 24 feeds a sequence of images to the neural network 28. The neural network 28 classifies the scene, recognizes the type of the buildings or infrastructures around the vehicle 20 and alerts the user or the system that a specific infrastructure has been detected. The user may define in advance the type of infrastructures the system 24 should look for and select the destination for the vehicle within the identified parking area or lot. The neural network 28 continues monitoring and classifying the scene to confirm and raise the confidence of the classification.

Depending on the type and configuration of the parking lot, for example a campground or a shopping mall parking lot, the system 24 may initiate a different behavior as well as a different scanning method to detect a free parking spot. Such detection and operating parameters are based on the location and vehicle configuration. The vehicle configuration may include operation with the trailer 22. For example, a vehicle with a trailer will required additional spots such as two vacant parking spots aligned vertically. Whereas a vacant parking spot in campground does not necessarily have lanes.

Figure 3:
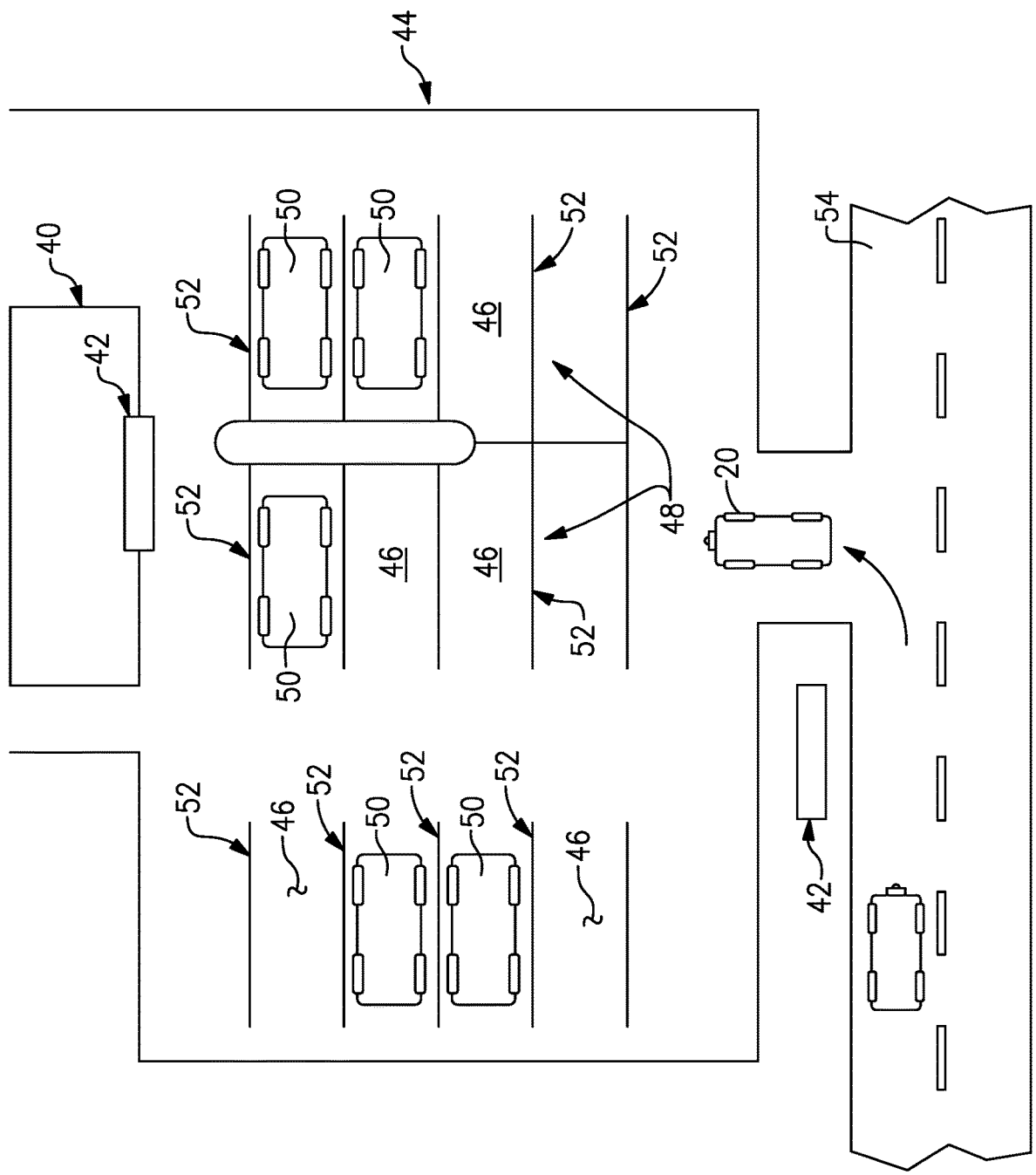
FIG. 3 is a schematic view of an example structure and parking lot associated with the structure.

Referring to FIG. 3, with continued reference to FIGS. 1 and 2, an example building 40 is shown adjacent to a parking lot 44. The example building 40 may be a store, supermarket, mall, hospital or any other structure commonly associated with a parking lot 44. The building 40 may include a sign 42 with a definite unique shape and lettering that provides a characteristic that can be utilized by the neural network 28 to determine and classify an environment of the vehicle 20.

The parking lot 44 includes lines 52 that define parking spaces 46. Other vehicles 50 within the parking spaces 46 may be utilized to further reinforce and verify the configuration of the parking lot 44. The vehicles 50 are aligned with the lines within each of the parking spaces. The vehicle 20 obtains images of the structure 40, signs 42, lines 52 and other vehicles 50 as it approaches the parking lot 44. The neural network 28 uses the images of these structures and objects to classify the environment of the vehicle 20. In this example, the vehicle 20 classifies the environment as being within a commercial store parking lot 44. The commercial store may be a grocery store, mall, big box store or any other similar structure.

The parking lot configuration associated with that environment is determined based on the environment of the vehicle 20. The parking assist system 24 may then direct the vehicle to an empty space 46 in assistance of the vehicle operator. The parking assist system 24 may also autonomously operate the vehicle 20 to park the vehicle within a defined space 46. Once the environment of the vehicle is determined as a parking lot 44, the automated parking assist system 24 initiates a parking function that corresponds to the parking lot configuration. The predetermined parking function may operate to direct a driver or to take over operation of the vehicle and maneuver the vehicle into an empty space 46. The predetermined parking functions account for the configuration of the vehicle 20. For example, a vehicle without a trailer may park in any open spot 46 where a vehicle with a trailer requires two open and vertically adjacent spots as shown at 48.

The example automated parking system 24 may simply provide guidance to a user operator or provide complete autonomous operation of the vehicle to park the vehicle 20 without operator input. It is within the contemplation of this disclosure that any vehicle parking system will benefit from the identification and classification of parking lot configurations provided in this disclosure.

Figure 4:
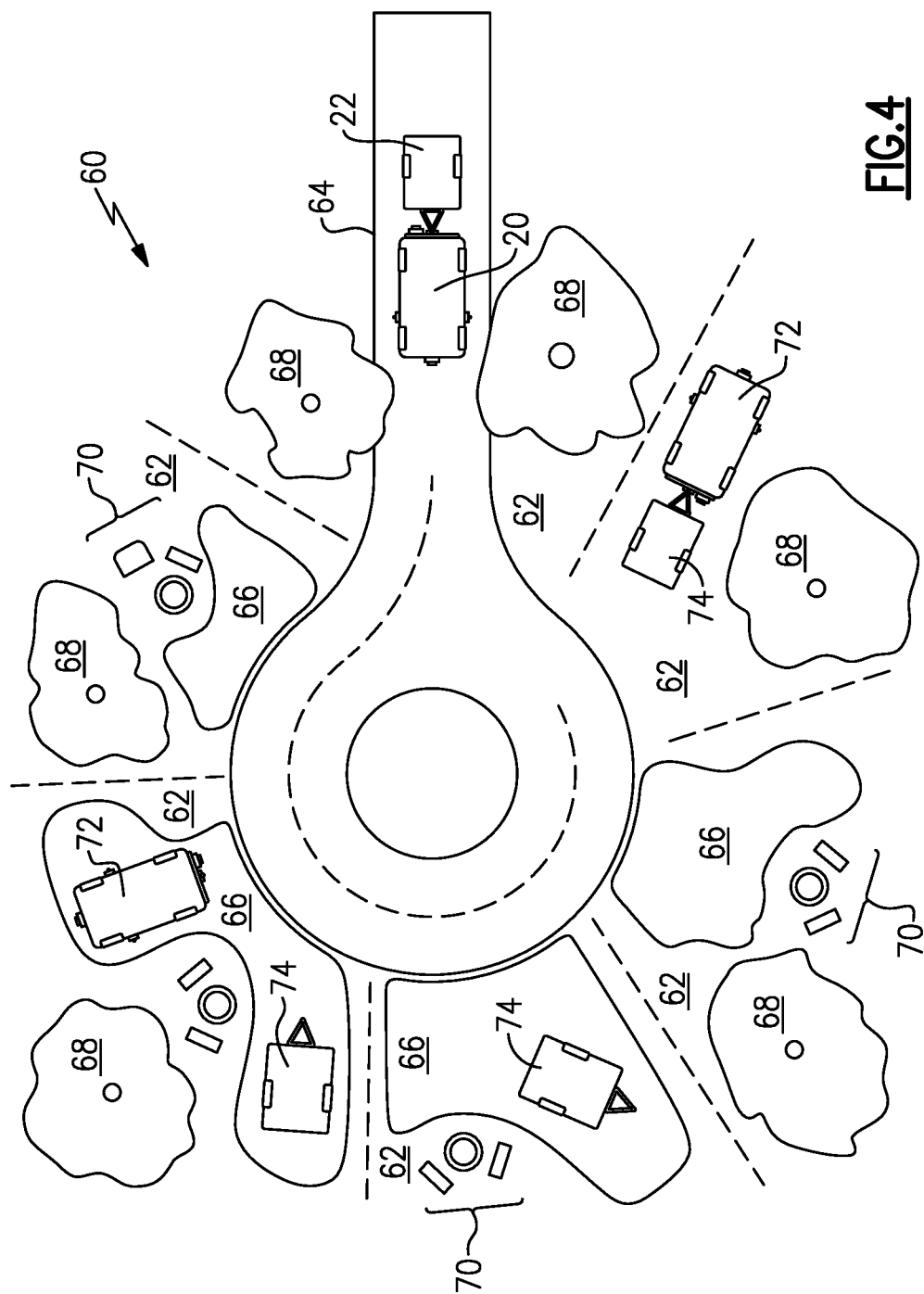
FIG. 4 is a schematic view of an example camp ground and associated spaces for parking.

Referring to FIG. 4 with continued reference to FIGS. 1 and 2, a campground 60 is schematically shown and includes a roadway 64 that may be paved or dirt that leads to several campsites 62. Each campsite 62 may include trees 68, other objects 70, and open areas. The other objects 70 can include fire pits, picnic tables, and benches. The campsites 62 will also include other vehicles 72 and trailers 74. There are not any defined parking areas and therefore the disclosed system operates in this environment in the same manner as with the parking lot 44. The cameras 36 feed images to the neural network 28. In this example, the images include trees 68, the roadway 64 and the various objects placed at each campsite. The neural network 28 uses the images and classifies the vehicle environment based on those images. In this example, the neural network 28 classifies the environment as a campground 60 based on the surrounding structures that in this example include the trees 68, open spaces 68 and other objects 76. The parking system 24 initiates operation of the vehicle based on the vehicle environment being in a campground 60. Vehicle operation for parking may include maneuvering to a specific campsite 62 and stopping the vehicle within the open space 66. The open space 66 for each campsite 62 may be unique and irregularly shaped such that definite alignment with a line or other object is not possible. Moreover, the vehicle 20 may be pulling a trailer 22 that is accounted for when determining where and how to maneuver a vehicle to a parking location.

The disclosed campground 60 is one example of an environment surrounding the vehicle where definite parking spots are not provided but the example system still determines the environment surrounding the vehicle and aids in determining an acceptable parking space.

Figure 5:
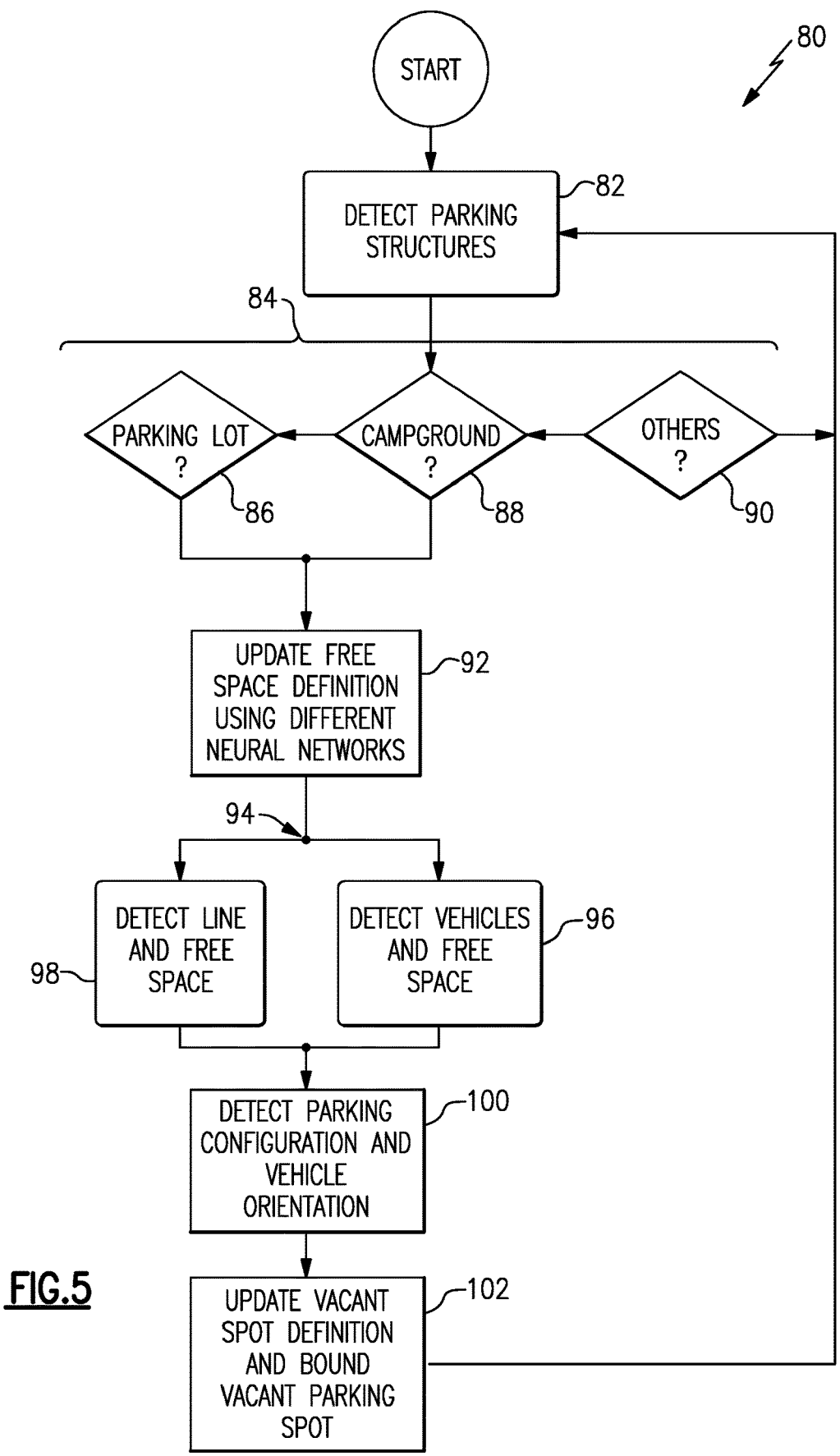
FIG. 5 is a flow diagram illustrating example steps for recognizing infrastructures for detecting a parking area configuration.

Referring to FIG. 5 with continued reference to FIGS. 1 and 2, a flow chart 80 is shown with example steps of operation for a disclosed automated parking system embodiment.

The example operation begins with detecting parking structures 82 proximate the vehicle 82. The parking structures 82 may include a parking lot 86, a campground 88 or some other structure 90. The type of parking structure is detected as indicated at 84 based on infrastructure and objects obtained from images of the environment surrounding the vehicle 20. Once the parking structure is identified, a free space definition is updated as indicated at 92. The free space definition is predefined and associated with the identified parking structure. For example, a free space within a parking lot like that shown in FIG. 3 is defined as being between lines 52. Alternatively, a free space within the campground as shown in FIG. 4 is an open area without trees or other objects.

The system provides a further definition as indicated at 94 based on the predefined free space definition. For the parking lot, a free space is between detected lines as indicated at 98. For both the parking lot and the campground, a free space is defined as a space without other vehicles. Accordingly, the system 24 detects the presence of other vehicles 96 utilizing captured images from the cameras 36.

The system further updates the parking configuration based on the vehicle configuration as indicated at 100. A large vehicle or a vehicle with a trailer or something attached to a roof rack is considered when detecting and locating an open parking spot.

The parking spot definition is continuously updated as indicated at 102 to provide a high level of confidence in operation of the vehicle. The sequence of operation is repeated to generate and improve recognition of parking lot configurations and the detection of free spaces.

The disclosed automated parking system obtains images and through image recognition processes with a neural network classifies a scene around the vehicle based on structures and objects within the captured images. The classified scene around the vehicle is then utilized by the parking assist system to initiate automated parking functions for the identified parking environment.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An automated parking system for a vehicle, the automated parking system comprising:
   a camera mounted to the vehicle configured to obtain the images of an environment surrounding the vehicle; and
   a processor configured to execute an artificial intelligence algorithm configured to detect a parking lot comprising unmarked parking areas based on input images, determine the environment surrounding the vehicle is the parking lot comprising unmarked parking areas based on the images of the environment surrounding the vehicle thorough execution of the artificial intelligence algorithm, determine an unmarked parking area from among the unmarked parking areas within the parking lot to park the vehicle, and control an automated parking function of the vehicle to park the vehicle in the unmarked parking area, wherein the environment surrounding the vehicle comprises structures, and wherein the artificial intelligence algorithm is configured to classify the environment surrounding the vehicle as the parking lot based on types of the structures.

2. The automated parking system as recited in claim 1, wherein the artificial intelligence algorithm includes a neural network configured to classify the environment surrounding the vehicle based on a comparison of stored images corresponding to a known parking lot and the obtained images.

3. The automated parking system as recited in claim 1, wherein the processor is configured to execute the automated parking function to park the vehicle within the unmarked parking area of the parking lot based on a configuration of the vehicle.

4. The automated parking system as recited in claim 3, wherein the configuration of the vehicle includes a trailer.

5. The automated parking system as recited in claim 1, wherein a structure among the structures is a building.

6. The automated parking system as recited in claim 1, wherein a structure among the structures is a sign.

7. A method of automated parking of a vehicle, the method comprising:
   obtaining, by a camera mounted to the vehicle, images of an environment surrounding the vehicle;
   executing an artificial intelligence algorithm configured to detect a parking lot comprising unmarked parking areas based on input images;
   classifying the environment surrounding the vehicle as the parking lot comprising unmarked parking areas based on the images of the environment surrounding the vehicle through execution of the artificial intelligence algorithm;
   determining an unmarked parking area from among the unmarked parking areas within the parking lot to park the vehicle; and
   controlling an automated parking function of the vehicle to park the vehicle in the unmarked parking area,
   wherein the environment surrounding the vehicle comprises structures, and
   wherein the classifying comprises the artificial intelligence algorithm classifying the environment surrounding the vehicle as the parking lot based on types of the structures.

8. The method as recited in claim 7, wherein the classifying comprises classifying the environment surrounding the vehicle based on comparisons of stored images corresponding to known infrastructure and a parking lot configuration corresponding with the known infrastructure.

9. The method as recited in claim 7, further comprising determining a configuration of the vehicle.

10. The method as recited in claim 9, wherein the configuration of the vehicle includes a trailer.

11. The method as recited in claim 8, further comprising defining unmarked parking area based on placement of other vehicles within the environment.

12. A non-transitory computer-readable recording medium having embodied thereon a program, which when executed by a processor causes the processor to control a method of automated parking of a vehicle, the method comprising:
   obtaining, by a camera mounted to the vehicle, images of an environment surrounding the vehicle;
   executing an artificial intelligence algorithm configured to detect a parking lot comprising unmarked parking areas based on input images;
   determining the environment surrounding the vehicle as a parking lot comprising unmarked parking areas based on the images of the environment surrounding the vehicle through execution of the artificial intelligence; and controlling an automated parking function of the vehicle to park the vehicle in the unmarked parking area, wherein the environment surrounding the vehicle comprises structures, and wherein the classifying comprises the artificial intelligence algorithm classifying the environment surrounding the vehicle as the parking lot based on types of the structures.

13. The non-transitory computer-readable recording medium as recited in claim 12, wherein the parking lot comprises an area of a campground.

14. The non-transitory computer-readable recording medium as recited in claim 12, wherein the parking lot comprises an area such that definite alignment with a line or other object of the automated parking function is not possible.

15. The non-transitory computer-readable recording medium as recited in claim 12, wherein the parking lot comprises an area that excludes definite parking spots.

16. The non-transitory computer-readable recording medium as recited in claim 12, wherein the parking lot comprises an area that excludes parking lines.

17. The non-transitory computer-readable recording medium as recited in claim 12, wherein the unmarked parking areas are irregularly shaped.

* * * * *